D. KISER.
SPRING WHEEL.
APPLICATION FILED FEB. 26, 1910.
976,660. Patented Nov. 22, 1910.
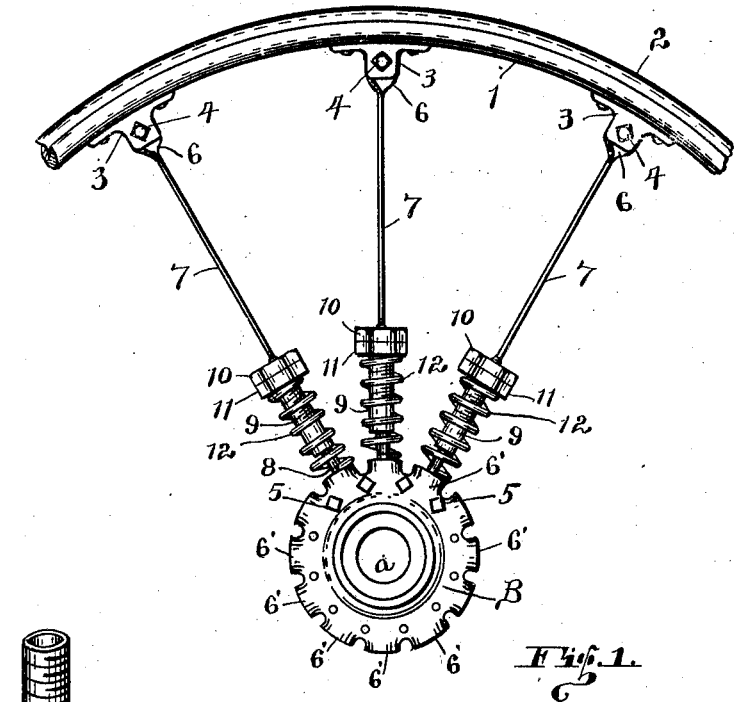
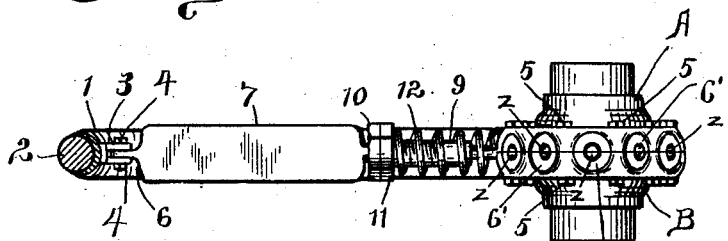
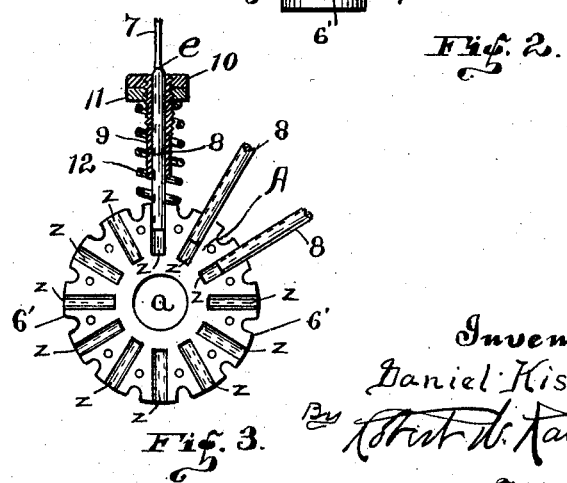
Witnesses:
Adelaide Kearns
R. E. Randle
Inventor
Daniel Kiser;
By Robert W. Randle
Attorney.

UNITED STATES PATENT OFFICE.

DANIEL KISER, OF RICHMOND, INDIANA.

SPRING-WHEEL.

976,660.   Specification of Letters Patent.   Patented Nov. 22, 1910.

Application filed February 26, 1910. Serial No. 546,043.

*To all whom it may concern:*

Be it known that I, DANIEL KISER, a citizen of the United States, residing in Richmond, in the county of Wayne and State of Indiana, have invented certain new and useful Improvements in Spring-Wheels, of which the following is a full, clear, and comprehensive exposition, being such as will enable others to make the same with absolute exactitude.

The object of this invention, broadly stated, is to provide a wheel composed of metal, which will be strong and durable in construction, and which can be manufactured and sold at a comparatively low price.

A further object is to provide a vehicle wheel having compound spring means contained therein whereby it will not be necessary to employ pneumatic tires in connection therewith but at same time containing therein the means for absorbing jars incident to unevenness in roadways, and to provide a wheel which will be mechanically efficient.

Other objects and particular advantages of my invention will be made apparent in the course of the following specification, and that which is new will be set forth in the appended claim.

The preferred manner of constructing my invention is shown in the accompanying drawings, in which—

Figure 1 is a side elevation of a portion of a wheel constructed in accordance with my invention. Fig. 2 is a top or plan view of a portion of my wheel. Fig. 3 is a detail view of the central portion of my wheel. And Fig. 4 is a detail perspective view of the thimble used in connection with my wheel.

Similar reference characters denote like parts throughout the several views.

In the drawings numeral 1 denotes the rim.

Numeral 2 denotes a rubber tire seated in the channel of the rim 1. Spaced an equal distance apart and secured around on the inner side of the rim 1 is a plurality of clip like hangers 3, each having two lugs spaced apart with a bolt aperture through said lugs to receive the bolt 4, said bolt being located at right-angles to the rim 1, the space between the lugs being parallel with the rim. The hub comprises two members, A and B, which are similar to each other, each having a face, as that shown in Fig. 3, which faces are adapted to contact with each other and to be held rigidly in contact by the bolts 5. Formed around on the periphery of the central, larger, portion of the hub are a plurality of circular bosses 6', which rise above the regular contour of the periphery of the hub. One half of each of said bosses being on the respective members A and B, as indicated. Formed centrally through each of said bosses and extending in to near the central aperture *a* of the hub are the sockets *z*, which are located radially around the hub and at right-angles to the axis thereof. The number of said bosses, sockets, and hangers 3, should be equal with each other the spokes which I will now describe also being equal in number therewith. Each of said spokes consists essentially of three distinct portions formed integral with each other: a flattened outer end 6 fitting between the lugs of the hanger 3 and having an aperture through which passes the bolt 4; the major portion 7 which is flattened and which is disposed at right-angles to the part 6, said part 7 being of such thickness and material as to form a resilient spring which is adapted to bend when pressure is applied laterally thereto; and the inner portion 8 which is round in cross section, and which is adapted to fit and slide in said socket *z*. It should be noted that the member 8 does not extend to the bottom of said socket in fact, normally extending only about half-way thereinto.

Numeral 9 refers to a thimble which is adapted to slide over the member 8 with its outer end engaging the shoulder *e* formed by reason of the section 7 being flattened as shown. The length of said thimble is such that when its outer end is against said shoulder its inner end will be some distance away from the face of the boss 6 as indicated. The periphery of the outer portion of said thimble is threaded to receive thereon the two jam-nuts, or lock-nuts, 10 and 11. Said nuts 10 and 11 are adapted to be locked together on the outer end of the thimble 9 as indicated. Encircling the thimble 9 is the helical spring 12, its outer end being seated against the nut 11 and its inner end being seated on the face of the boss 6 concentric with the socket *z*. The tension of said spring may be varied by simply changing the position of said nut on the thimble.

It is to be understood that all of the spokes for the complete wheel are to be of like construction to that above described, and that all of the spokes are to be likewise connected to the hub and provided with a thimble, spring, and nut, all as shown and set forth.

In practice it will be apparent that the members 7 of the spokes are adapted to bend slightly sidewise under pressure or strain, in order to absorb the shocks which the wheel may encounter when in use, also that the springs 12 will receive and neutralize the greater proportion of such shocks or jars.

By reason of the fact that the outer ends of the spokes are pivoted and that the inner ends thereof are free to move in said sockets 2, it is apparent that the spokes may have a considerable latitude of movement to bend in their central portions.

The springs 12 tend also to retain the hub in proper position with relation to the balance of the wheel, that is,—by means thereof the hub is retained normally centered with relation to the rim.

Having now fully shown and described my invention, what I claim and desire to secure by Letters Patent of the United States, is—

A spring wheel comprising a rim, hangers secured to said rim, a plurality of spokes having their outer ends pivoted in said hangers, a hub, bosses formed around on the periphery of the hub, said hub having sockets formed through said bosses and extending into the hub and the inner ends of said spokes each being operative in one of said sockets, said spokes having their major portions flattened forming springs with the inner ends of the spokes formed round in cross section, a thimble disposed loosely on the rounded portion of each of the spokes with its upper end impinging the shoulder formed by the flattened portion of the spoke and the inner end of the thimble being some distance from said boss, a helical spring encircling said thimble and having one end seated on the boss surrounding said socket, a lock nut threaded on the outer portion of the thimble and against which the upper end of said helical spring engages, all substantially as and for the purposes set forth.

In testimony whereof I have hereunto subscribed my name to this specification in the presence of two subscribing witnesses.

DANIEL KISER.

Witnesses:
R. E. RANDLE,
ROBERT W. RANDLE.